(12) United States Patent
Sakamoto (10) Patent No.: US 11,277,049 B2
(45) Date of Patent: Mar. 15, 2022

(54) FIRE-SPREAD PREVENTION MEMBER, ELECTRICAL DEVICE, AND IMAGE FORMING APPARATUS

(71) Applicant: Shogo Sakamoto, Kanagawa (JP)

(72) Inventor: Shogo Sakamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 16/738,073

(22) Filed: Jan. 9, 2020

(65) Prior Publication Data
US 2020/0244135 A1 Jul. 30, 2020

(30) Foreign Application Priority Data
Jan. 29, 2019 (JP) .............................. JP2019-013039

(51) Int. Cl.
| | | |
|---|---|---|
| *G03G 15/00* | (2006.01) | |
| *H02K 5/00* | (2006.01) | |
| *H02K 5/04* | (2006.01) | |
| *H02K 5/136* | (2006.01) | |

(52) U.S. Cl.
CPC .............. *H02K 5/04* (2013.01); *G03G 15/80* (2013.01); *H02K 5/136* (2013.01); *H02K 2211/03* (2013.01)

(58) Field of Classification Search
CPC ......... G03G 15/80; G03G 2215/00978; H02K 5/02; H02K 5/04; H02K 2211/00; H02K 2211/03; H02K 5/136
USPC .............................................. 399/33, 36, 88
See application file for complete search history.

(56) References Cited

U.S. PATENT DOCUMENTS

| | | | | |
|---|---|---|---|---|
| 4,972,111 A | * | 11/1990 | Baker | A62C 8/08 310/88 |
| 9,075,375 B2 | * | 7/2015 | Tsuji | G03G 15/55 |
| 2008/0067899 A1 | * | 3/2008 | Son | G11B 25/043 310/67 R |
| 2014/0030121 A1 | * | 1/2014 | Richter | H02K 11/33 417/410.1 |
| 2014/0079433 A1 | * | 3/2014 | Watanabe | G03G 21/1619 399/107 |
| 2015/0076934 A1 | * | 3/2015 | Jang | H02K 11/30 310/43 |
| 2017/0139369 A1 | * | 5/2017 | Matsuno | H04N 1/00551 |
| 2018/0338374 A1 | * | 11/2018 | Li | F01P 5/04 |
| 2019/0307013 A1 | * | 10/2019 | Hashizume | H05K 7/1422 |
| 2020/0331716 A1 | * | 10/2020 | Takahashi | B65H 1/266 |

FOREIGN PATENT DOCUMENTS

| | | | |
|---|---|---|---|
| JP | 4-270354 | | 9/1992 |
| JP | 9-075209 | | 3/1997 |
| JP | 10-339472 | | 12/1998 |
| JP | 2010072520 A | * | 4/2010 |
| JP | 2012-220151 | | 11/2012 |
| JP | 2017156492 A | * | 9/2017 |

* cited by examiner

*Primary Examiner* — Robert B Beatty
(74) *Attorney, Agent, or Firm* — Harness, Dickey & Pierce, P.L.C.

(57) ABSTRACT

A fire-spread prevention member is interposed between an electrical component and a combustible member. The fire-spread prevention member includes a bent portion that is disposed outside an outer edge of the electrical component and bent to a side on which the electrical component is disposed. The fire-spread prevention member is made of non-combustible material.

11 Claims, 10 Drawing Sheets

FIRE-SPREAD PREVENTION MEMBER, ELECTRICAL DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2019-013039, filed on Jan. 29, 2019, in the Japan Patent Office, the entire disclosure of which is hereby incorporated by reference herein.

BACKGROUND

Technical Field

This disclosure relates to a fire-spread prevention member, an electrical device, and an image forming apparatus.

Description of the Related Art

An apparatus is known that includes a fire-spread prevention member to prevent a fire from spreading to a combustible member when an electrical component is ignited. Such a fire-spread prevention member is made of non-combustible material and provided between the electrical component and the combustible member.

However, if the electrical component ignites due to a tracking phenomenon and the like and a flame spreads to an outer edge of the electrical component, the flame from the outer edge may spread not toward the fire-spread prevention member, but toward the combustible member. As a result, undesirably, the fire may spread to the combustible member that is disposed on an opposite side of the electrical component across the fire-spread prevention member and disposed outside the outer edge of the electrical component.

SUMMARY

An embodiment of this disclosure provides a fire-spread prevention member that is interposed between an electrical component and a combustible member. The fire-spread prevention member includes a bent portion that is disposed outside an outer edge of the electrical component and bent to a side on which the electrical component is disposed. The fire-spread prevention member is made of non-combustible material.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the attached drawings.

Figure 1:
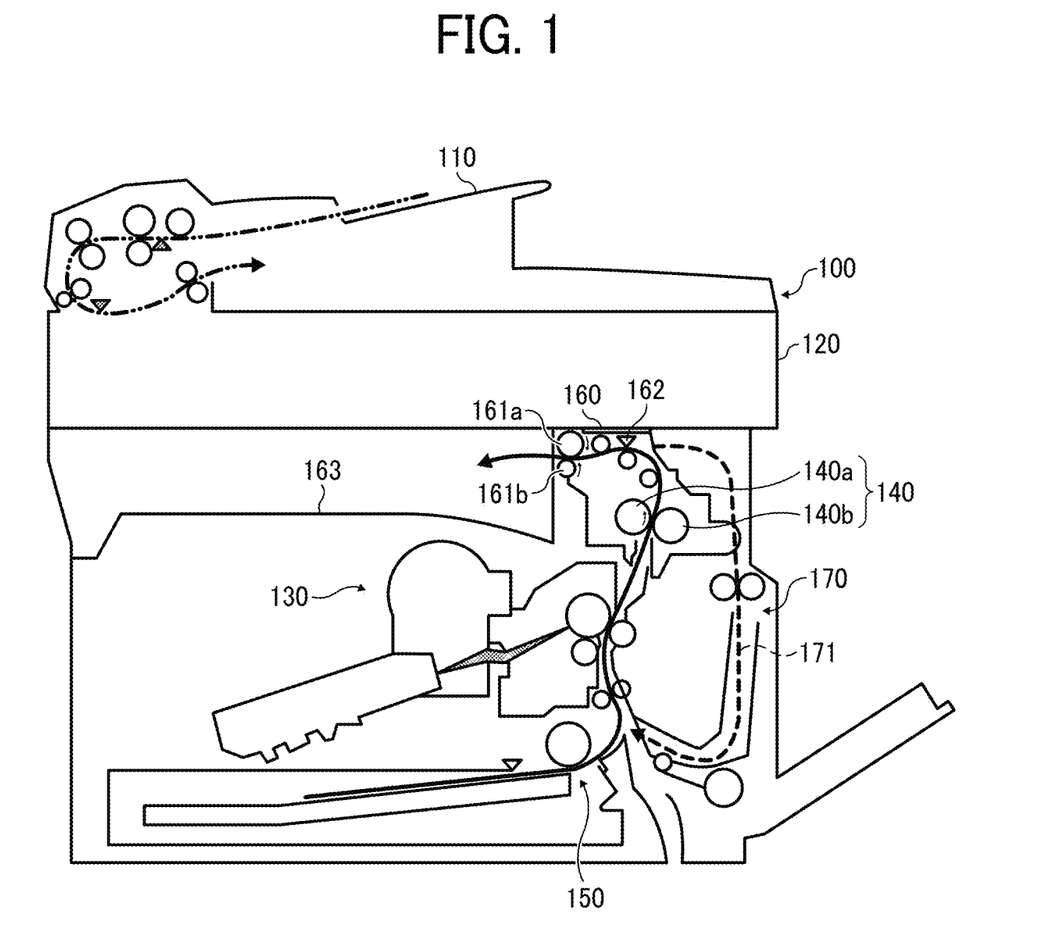
FIG. 1 is a schematic view of a configuration of an image forming apparatus including a driving device according to an embodiment of the present disclosure.

FIG. 1 is a schematic view of a configuration of an image forming apparatus 100 including a driving device according to an embodiment of the present disclosure.

As illustrated in FIG. 1, the image forming apparatus 100 includes an automatic document feeder (ADF) 110, a reading device 120, an image forming device 130, a fixing device 140, a sheet feeder 150, a sheet ejection device 160, and a sheet re-feeder 170.

In this embodiment, the ADF 110 includes a document feeding mechanism that supports sheet-through reading of documents. The reading device 120 reads a document sent to a reading position by the ADF 110 while the document is being conveyed.

The image forming device 130 includes, for example, a photoconductor, a charger, an optical writing unit, a developing unit, a transfer unit, a cleaning unit, and a discharge unit. That is, the image forming device 130 forms a latent image with the optical writing unit on the photoconductor to which a potential is applied by the charger, and develops the latent image with the developing unit into a visible toner image and transfers the toner image on a recording sheet with the transfer unit. The cleaning unit removes untransferred and remaining toner. The potential remaining on a surface of the photoconductor is discharged by the discharge unit and returned to zero potential.

The fixing device 140 includes a pressure roller 140b and a heating roller 140a as a pair of fixing rollers.

The sheet feeder 150 pulls out recording sheets stacked in a sheet tray one by one and sends the recording sheets to the transfer unit of the image forming device 130.

Whereas the sheet ejection device 160 ejects the recording sheets conveyed from the fixing device 140 to an output tray 163, the sheet ejection device 160 can switch back the recording sheets to a sheet re-feeder 170. In other words, the sheet ejection device 160 includes a pair of sheet ejection rollers 161a and 161b. When a sheet ejection sensor 162 detects that an edge portion of a recording sheet is nipped and held between the sheet ejection rollers 161a and 161b, the sheet ejection rollers 161a and 161b are reversely rotated to feed the recording sheet to the sheet re-feeder 170.

The sheet re-feeder 170 sends a recording sheet to the image forming device 130. First, the image forming device 130 forms an image on a recording sheet and an edge portion of the recording sheet is nipped between the sheet ejection rollers 161a and 161b of the sheet ejection device 160. Then, the sheet re-feeder 170 turns the nipped recording sheet upside down via a switchback path 171 indicated by a dotted line in FIG. 1, to make the other side of the recording sheet printable and sends the recording sheet to the image forming device 130. Note that the pair of sheet ejection rollers 161a and 161b has a structure in which the sheet ejection rollers 161a and the 161b rotate in opposite directions with respect to a rotation input by, for example, meshing external gears.

Figure 2:
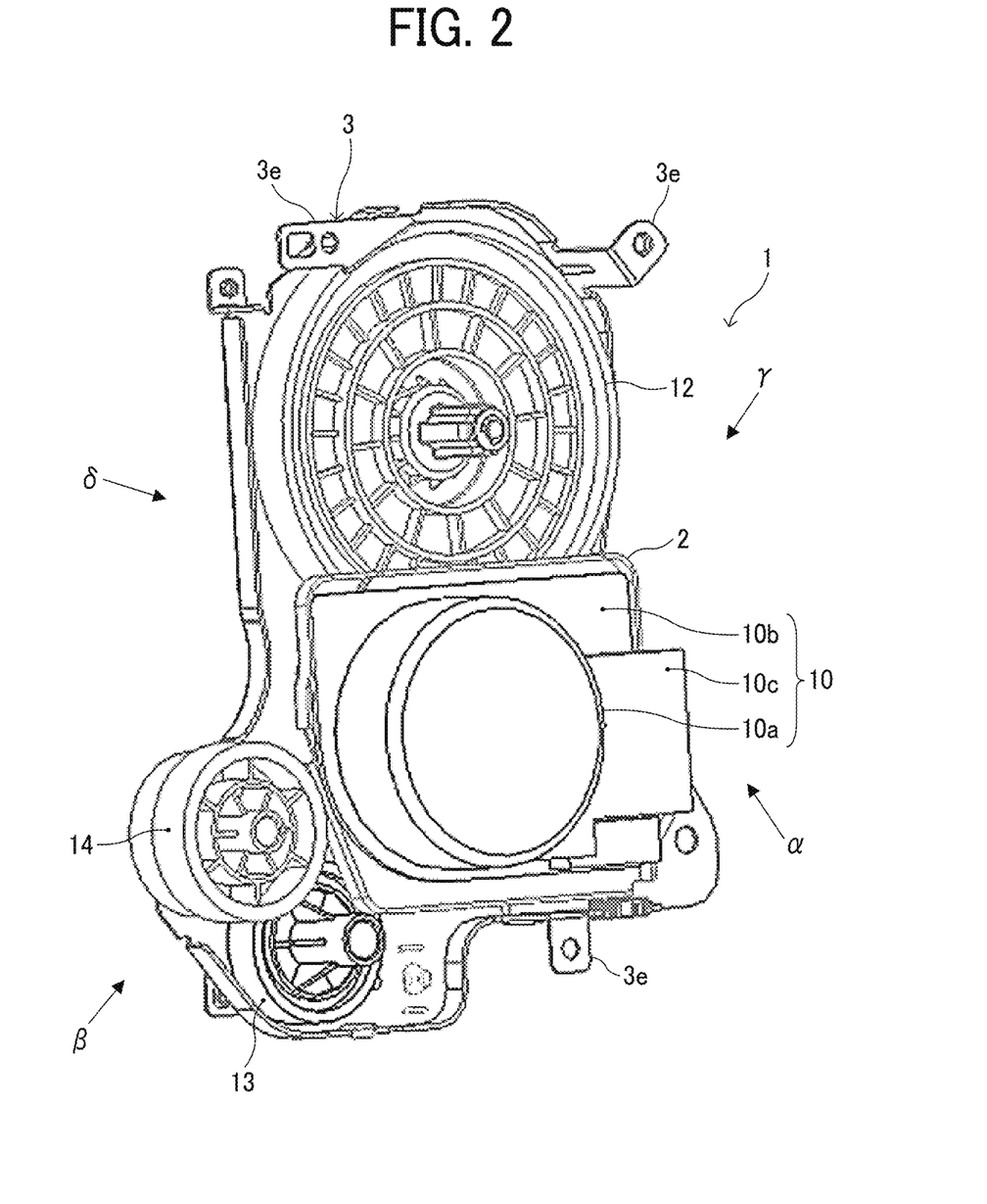
FIG. 2 is a perspective view of a main part of the driving device included in the image forming apparatus.
Figure 3:
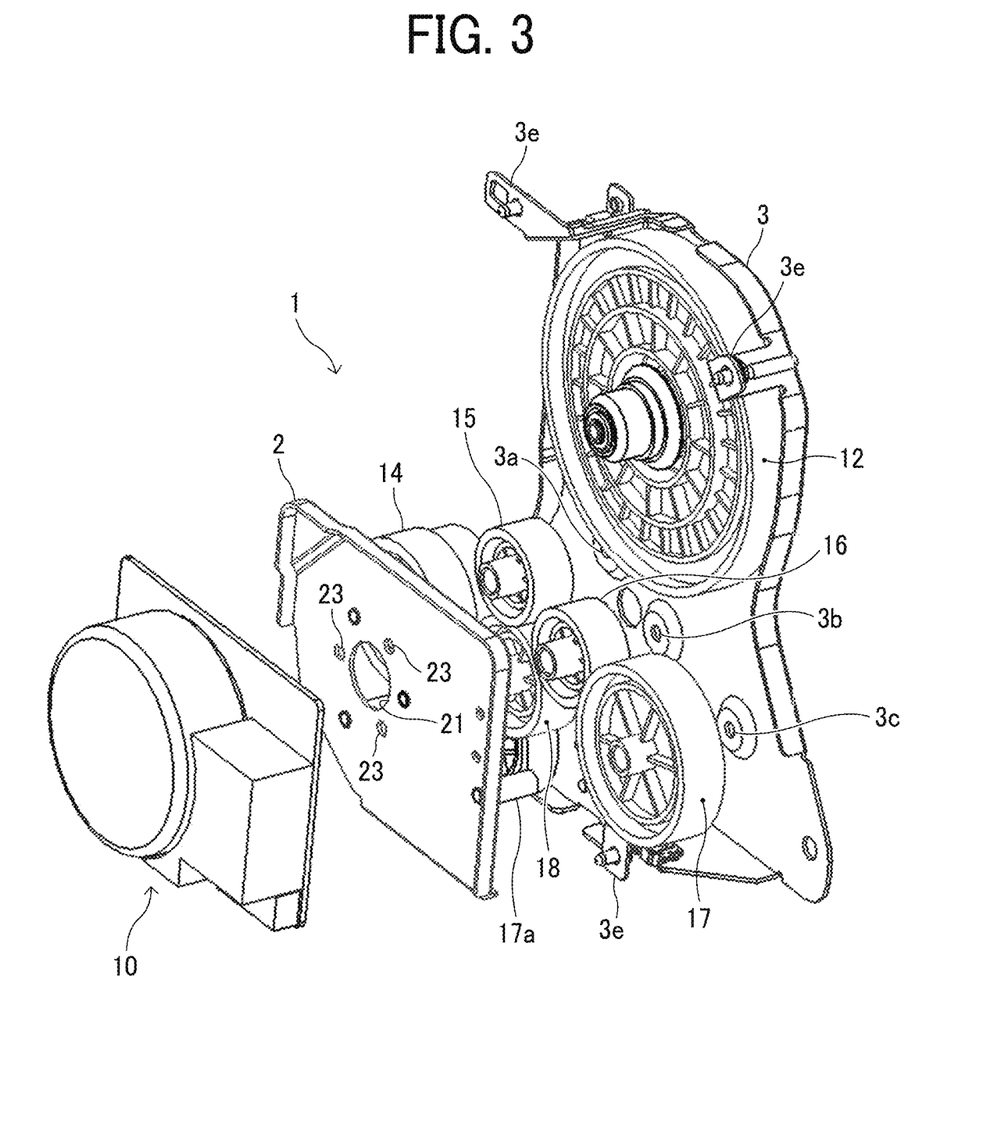
FIG. 3 is an exploded perspective view of the driving device viewed from a direction indicated by arrow α of FIG. 2.
Figure 4:
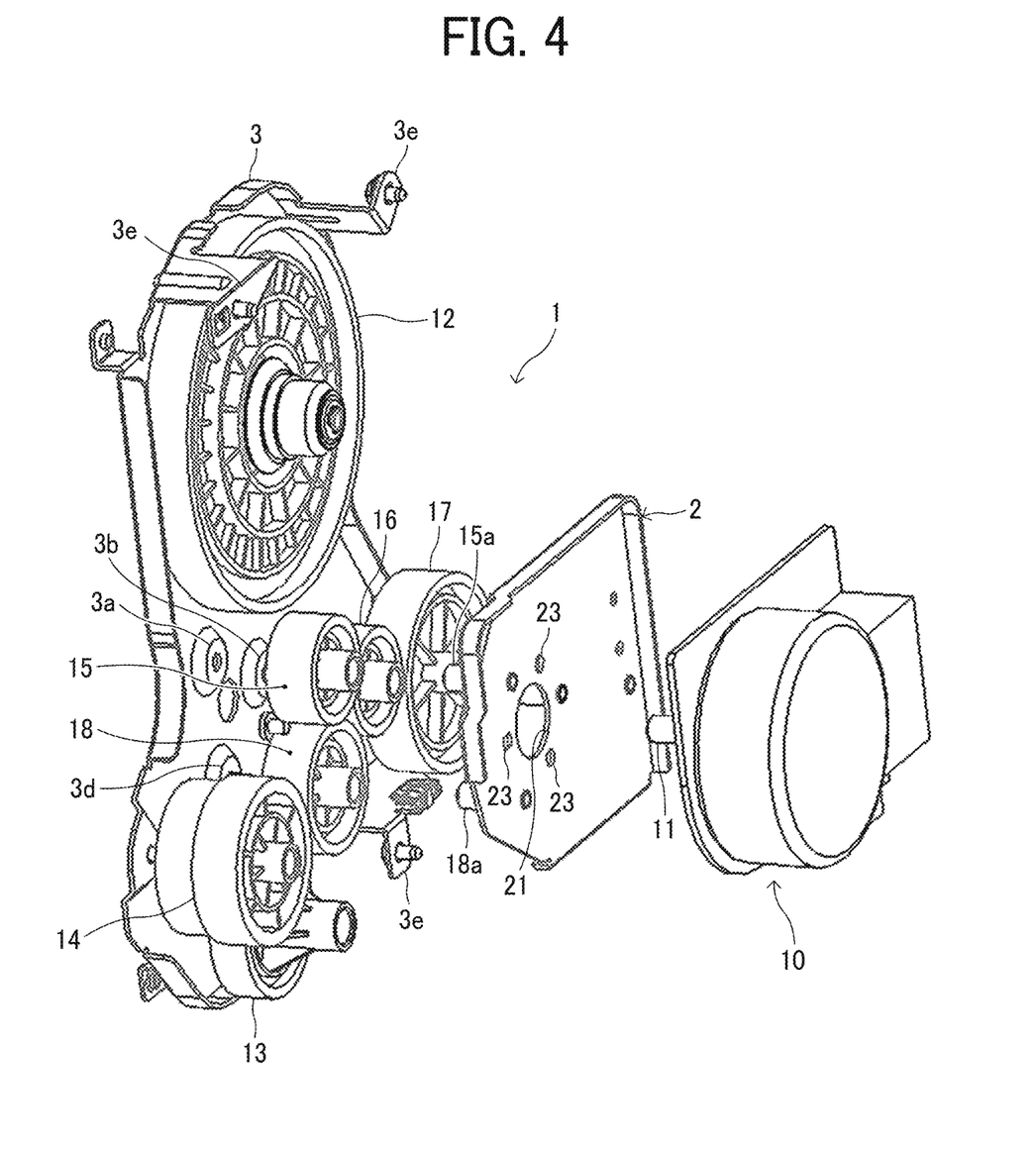
FIG. 4 is an exploded perspective view of the driving device viewed from a direction indicated by arrow β of FIG. 2.
Figure 5:
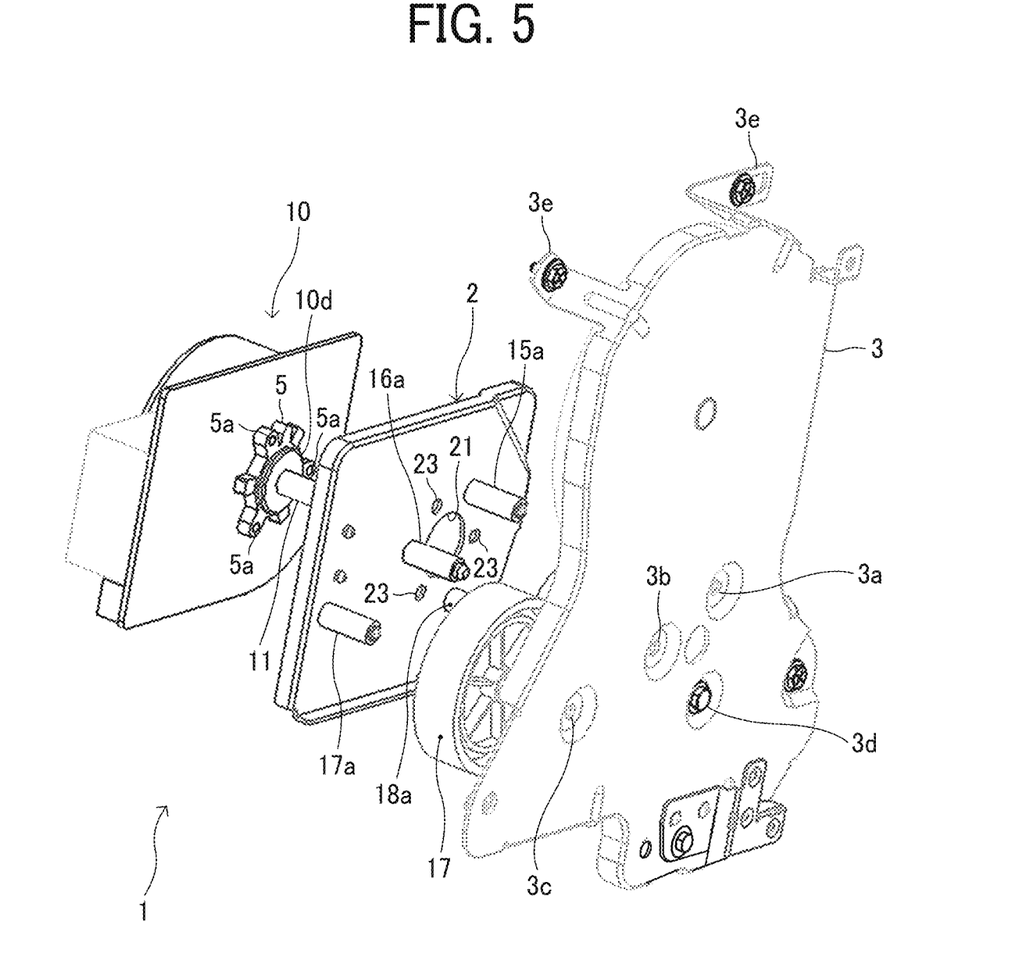
FIG. 5 is an exploded perspective view of the driving device viewed from a direction indicated by arrow γ of FIG. 2.
Figure 6:
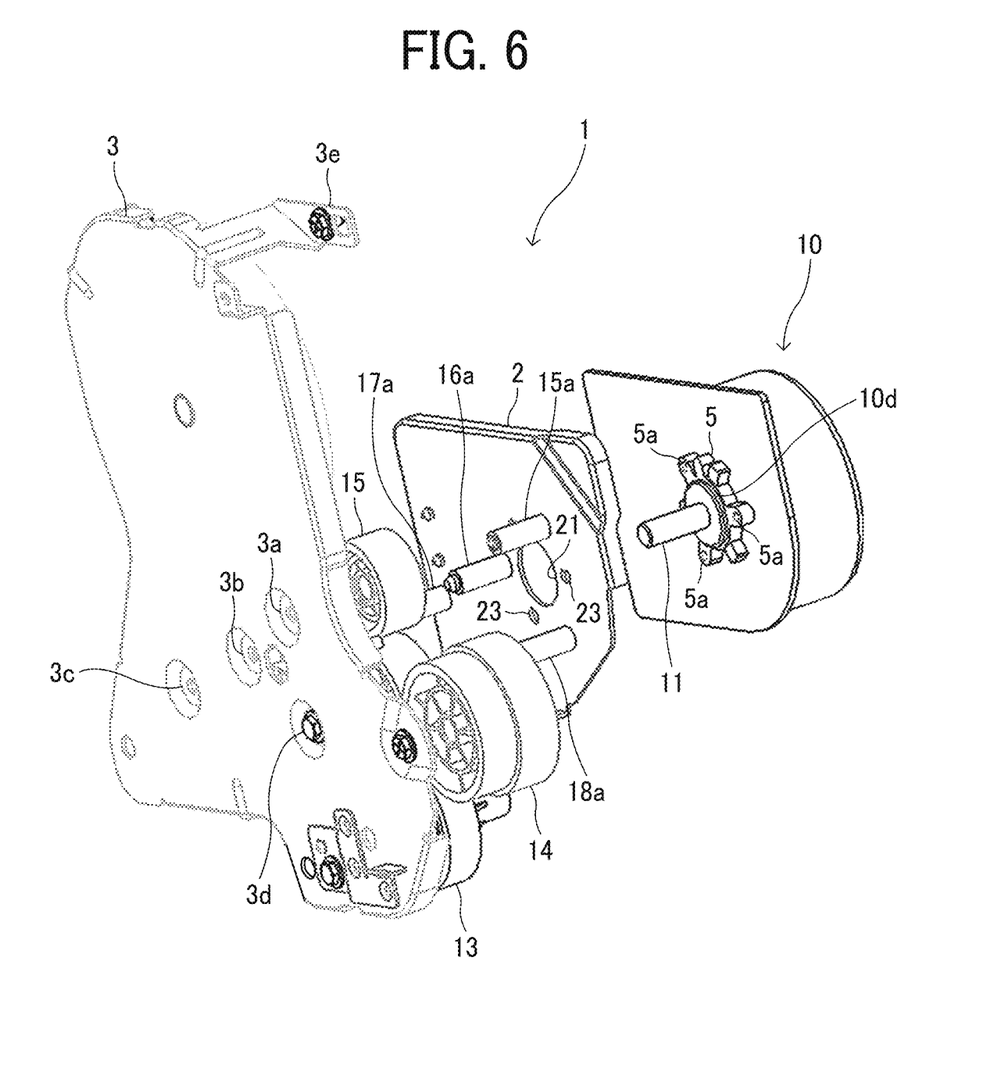
FIG. 6 is an exploded perspective view of the driving device viewed from a direction indicated by arrow δ of FIG. 2.

FIG. 2 is a perspective view of a main part of a driving device 1 as an electrical device included in the image forming apparatus 100. FIG. 3 is an exploded perspective view of the driving device 1 viewed from a direction indicated by arrow α in FIG. 2. FIG. 4 is an exploded perspective view of the driving device 1 viewed from a direction indicated by arrow β in FIG. 2. FIG. 5 is an exploded perspective view of the driving device 1 viewed from a direction indicated by arrow γ in FIG. 2. FIG. 6 is an exploded perspective view of the driving device 1 viewed from a direction indicated by arrow δ in FIG. 2.

A single drive motor 10 of the driving device 1 drives all drive members in the image forming apparatus. For example, the drive motor 10 drives the photoconductor, developing rollers of the developing device, a conveying screw that conveys developer, a heating roller 140a of the fixing device 140 and a plurality of conveyance rollers, such as the sheet ejection roller 161a, that conveys a recording sheet.

The driving device 1 includes the drive motor 10 as an electrical component. The drive motor 10 is positioned on and fixed to a motor support sheet metal 2 made of sheet metal as a fire-spread prevention member. The drive motor 10 is an outer rotor motor and includes a rotor portion 10a and a printed circuit board 10b as an electronic board. A driver integrated circuit (IC) 10c as an ignition source is mounted on a surface of the printed circuit board 10b on which the rotor portion 10a is disposed, and elements such as a capacitor as an ignition source are mounted on both sides of the printed circuit board 10b.

As illustrated in FIGS. 5 and 6, a motor positioning portion 10d is disposed on a motor shaft 11 that penetrates through the printed circuit board 10b (see FIG. 2). A motor mounting member 5 is attached to the motor positioning portion 10d. The motor mounting member 5 includes three screw holes 5a at equal intervals in a circumferential direction.

A motor positioning hole 21 is provided in a center portion of the motor support sheet metal 2. Screw-through holes 23 are provided around the motor positioning hole 21. The three screw-through holes 23 are positioned at equal intervals in a circumferential direction of the motor positioning hole 21.

The motor positioning portion 10d of the drive motor 10 is fitted into the motor positioning hole 21 of the motor support sheet metal 2 to position the drive motor 10 on the motor support sheet metal 2. Then, screws are inserted into the screw-through holes 23 of the motor support sheet metal 2 from a side on which gears are arranged and further inserted into the screw holes 5a of the motor mounting member 5 to fix the drive motor 10 to the motor support sheet metal 2.

Gears directly formed around the motor shaft 11 of the drive motor 10 mesh with a first idler gear 15, a second idler gear 16, and a third idler gear 18 (see FIGS. 3 and 4). The first idler gear 15 is meshed with a photoconductor gear 12 having a large diameter that transmits a driving force to the photoconductor. The second idler gear 16 meshes with a fourth idler gear 17. The third idler gear 18 meshes with a fifth idler gear 13. The fifth idler gear 13 meshes with one of two gear portions of a double gear 14, that is, a gear portion disposed on an opposite side of the drive motor 10.

The photoconductor gear 12 (see FIGS. 2, 3, and 4) is rotatably supported by a mounting bracket 3 made of sheet metal to attach the driving device 1 to a side plate of the image forming apparatus 100. A plurality of studs 15a, 16a, 17a, and 18a are provided on a surface of the motor support sheet metal 2 facing the gears. The first idler gear 15 is rotatably supported by the first stud 15a and the second idler gear 16 is rotatably supported by the second stud 16a. The third idler gear 18 is rotatably supported by the third stud 18a and the fourth idler gear 17 is rotatably supported by the fourth stud 17a.

The mounting bracket 3 includes a plurality of screw-fixing portions 3e having screw-through holes to attach the mounting bracket 3 to the side plate of the image forming apparatus with screws. The screws are inserted into the screw-through holes provided in the screw-fixing portions 3e. The screws are screwed into screw holes provided on the side plate of the image forming apparatus 100 to fix the driving device 1 onto the side plate of the image forming apparatus 100.

Screw holes are formed in top portions of the studs 15a, 16a, 17a, and 18a of the motor support sheet metal 2. Screw-through holes 3a, 3b, 3c, and 3d through which the screws penetrate are provided in a plurality of portions of the mounting bracket 3 that face the studs 15a, 16a, 17a, and 18a.

The screws are inserted into the screw-through holes 3a, 3b, 3c, and 3d of the mounting bracket 3. The screws are screwed into screw holes of the studs, 15a, 16a, 17a, and 18a to fasten the motor support sheet metal 2, on which the drive motor 10 is mounted, to the mounting bracket 3.

The gears 12, 13, 14, 15, 16, 17, and 18 of the driving device 1 are made with polyacetal (POM) resin to take advantage of properties of resin having excellent mechanical strength, wear resistance, and slidability. However, the POM resin has a high oxidation index, is often a horizontal burning (HB) material (combustible) according to UL (Underwriters Laboratories) 94 standard, and might spread fire.

Capacitors, driver ICs, and the like are mounted on the printed circuit board 10b of the drive motor 10 as the electrical components, and for example, the capacitors or the driver ICs might catch a fire due to a tracking phenomenon. A plurality of measures is taken to prevent such ignition, such as stopping electricity power supply to the drive motor 10 when excess current flows. In an unlikely event that a capacitor or driver IC ignites due to a failure of such a control measure, a flame caused by the ignition might spread to the gears 12, 13, 14, 15, 16, 17, and 18 made of POM resin.

In the present embodiment, the motor support sheet metal 2 as a fire-spread prevention member is made of metal as a non-combustible material. If the drive motor 10 catches a fire, the flame is shielded by the motor support sheet metal 2 and the fire can be prevented from spreading to the gears 15, 16, 17, and 18 made of combustible material and disposed opposite to the motor support sheet metal 2.

However, a flame ignited from the capacitors, the driving device ICs and the like may spread to the printed circuit board 10b and develop from an end portion of the printed circuit board 10b. In such a case, undesirably the fire might spread to the photoconductor gear 12, the double gear 14, the fifth idler gear 13, and the like that are disposed outside the motor support sheet metal and are not facing the motor support sheet metal 2. In particular, due to a property of flame that burns upward, a flame spreading to the printed circuit board 10b is likely to develop from an upper end of the printed circuit board 10b, and the flame is likely to spread to the photoconductor gear 12 disposed above the drive motor 10.

For this reason, it is conceivable to completely cover the drive motor 10 with a non-combustible material such as metal. However, such a configuration might lead to a cost increase of the apparatus. Alternatively, it is conceivable to enlarge and position the motor support sheet metal 2 to face and cover all the gears, which might undesirably lead to a cost increase of the apparatus, like the above-described configuration. Further, it is conceivable that the photoconductor gear 12, the double gear 14, the fifth idler gear 13 and the like are made of non-combustible material such as metal. Undesirably, such a configuration might lead to an increased noise level, image degradation and a cost increase of the apparatus.

Therefore, in the present embodiment, spreading of fire to the photoconductor gear 12, the double gear 14, the fifth idler gear 13 and the like is restrained as follows.

Figure 7:
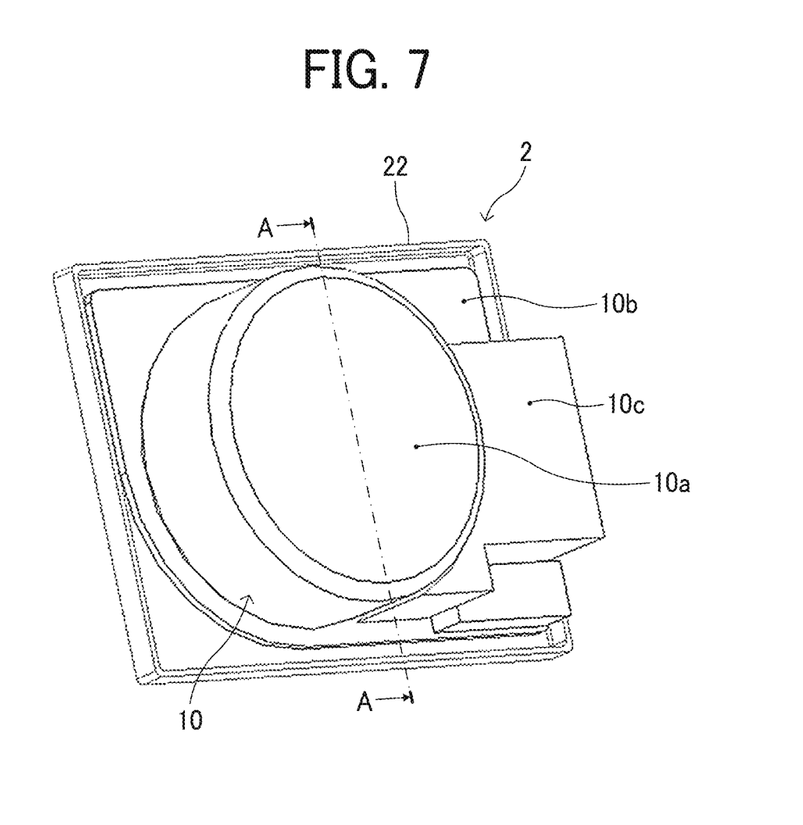
FIG. 7 is a perspective view of a part of the driving device.

FIG. 7 is a perspective view of a main part of the driving device 1 according to the present embodiment.

In the present embodiment, as illustrated in FIG. 7, an edge portion of the motor support sheet metal 2 is bent to a side on which the drive motor 10 is disposed to form an outer-edge cover 22. The outer-edge cover 22 is provided as a bent portion that faces and covers at least an outer edge (edge face) that is an edge portion of the printed circuit board 10b of the drive motor 10.

Figure 8A:
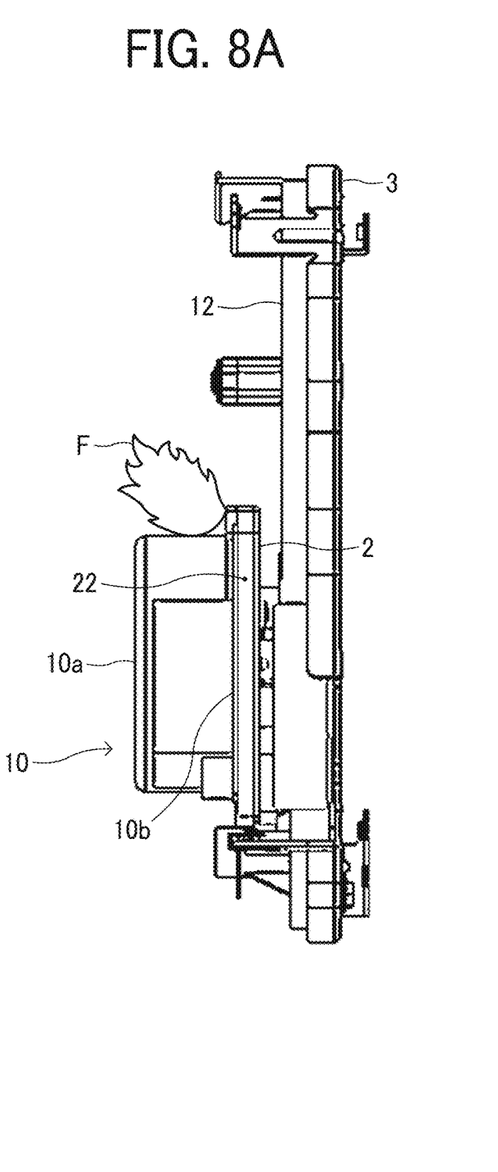
FIG. 8A is an illustration of an example of fire development in the driving device.
Figure 8B:
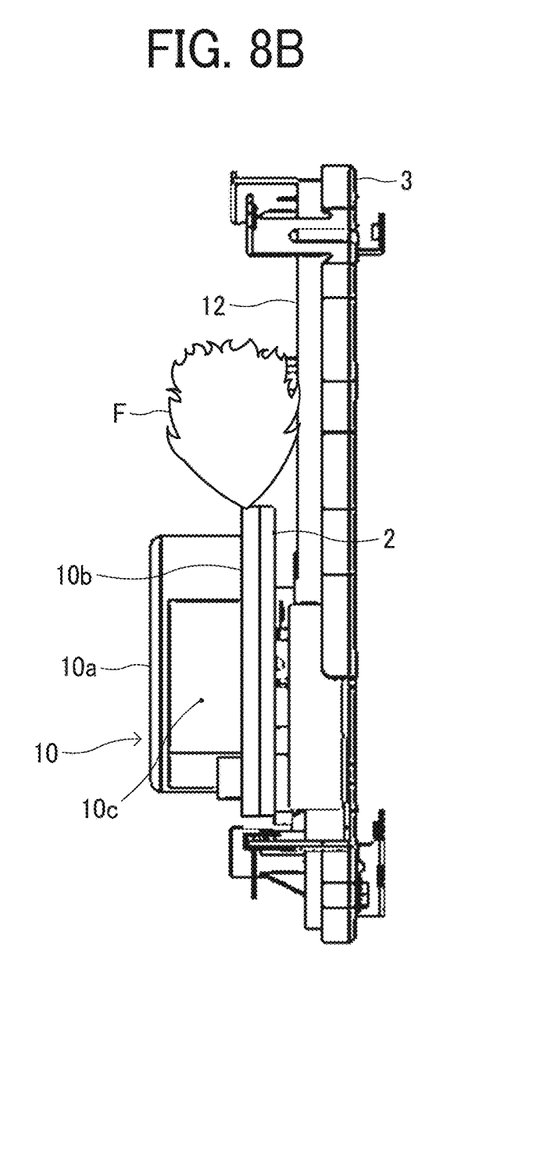
FIG. 8B is an example of fire development in a comparative example.

FIG. 8A is a schematic view illustrating a case in which a flame develops from an upper end of the printed circuit board 10b in the present embodiment. FIG. 8B is a schematic view illustrating a case in which a flame develops from an upper end of the printed circuit board 10b in a comparative example.

Conventionally, since the motor support sheet metal 2 does not have an outer-edge cover, a flame spreading to the printed circuit board 10b and burning from an upper end of the printed circuit board 10b spreads in all directions. As illustrated in FIG. 8B, a range of flame F spreads to a side on which gears are disposed, not to the motor support sheet metal 2. As a result, the flame F reaches the photoconductor gear 12 that is a combustible member, and the photoconductor gear 12 might catch a fire.

On the other hand, in the present embodiment, the outer-edge cover 22 is provided with the motor support sheet metal 2. The outer-edge cover 22 prevents a flame from developing straight upward from the upper end of the printed circuit board 10b or a flame from developing obliquely upward to the side on which the gears are disposed. As a result, as illustrated in FIG. 8A, the flame F spreading to the printed circuit board 10b and developing from the upper end of the printed circuit board 10b spreads obliquely upward to the side on which the drive motor 10 is disposed, and thus the flame F can be prevented from reaching the photoconductor gear 12. Such a configuration can favorably restrain fire from spreading to the photoconductor gear 12.

As described above, in the present embodiment, if the drive motor 10 catches a fire from an end portion of the printed circuit board 10b, the flame can be prevented from spreading to gears disposed outside of the motor support sheet metal 2 (gears that are not disposed facing the motor support sheet metal 2). As a result, apparatus safety can further increase.

Further, in the present embodiment, covering only the outer edge of the printed circuit board 10b can restrain the fire from spreading onto the gears, and a height of about several millimeters only of the outer-edge cover 22 can cover the outer edges of the printed circuit board 10b (the outer-edge cover 22 can be opposed to the end portions of the printed circuit board 10b). Therefore, the outer-edge cover 22 can be easily formed by a drawing process and the manufacturing cost can be inexpensive. In addition, the material cost can be greatly reduced compared to a case where the drive motor 10 is surrounded by parts made of non-combustible material or all the gears of the driving device 1 are covered by non-combustible members, thus reducing the cost of the apparatus.

Figure 9:
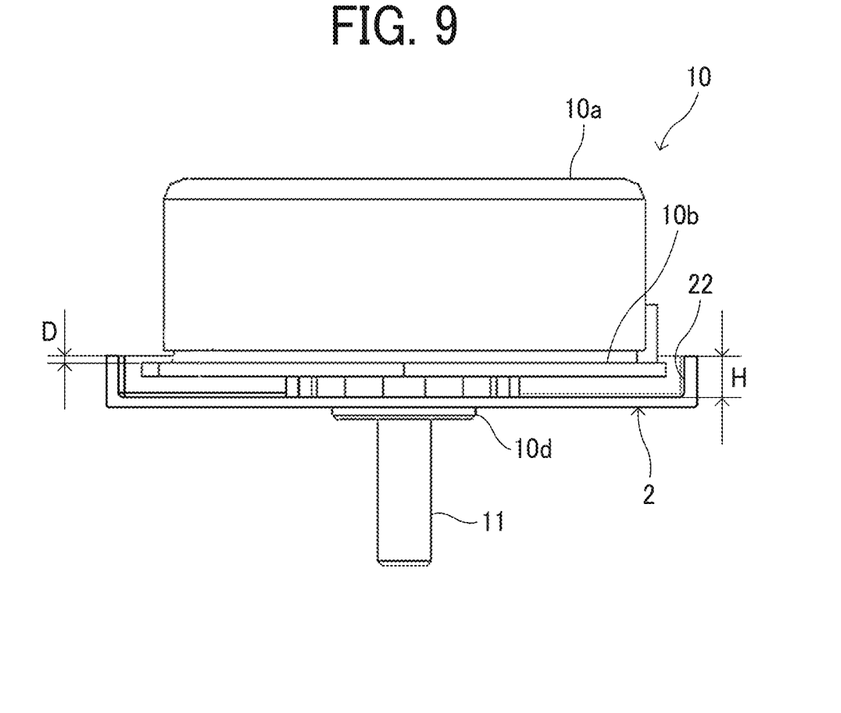
FIG. 9 is a cross-sectional view of the driving device, cut along a line A-A illustrated in FIG. 7.

FIG. 9 is a cross-sectional view of the main part of the driving device cut along a line A-A in FIG. 7.

As illustrated in FIG. 9, the outer-edge cover 22 protrudes by D mm beyond a surface of the printed circuit board 10b facing the rotor portion 10a.

As described above, the outer-edge cover 22 extends from a surface of the printed circuit board 10b closer to a rotor portion 10a side. Thus, it is possible to keep a fire developing from an end portion of the printed circuit board 10b away from the gears compared to a case in which the outer-edge cover 22 does not extend from a surface of the printed circuit board 10b. As a result, fire spreading to the gears can be further limited.

In the present embodiment, the motor support sheet metal 2 has a thickness of 1 mm, and the outer-edge cover 22 formed by drawing has a height H of 6 mm. The height H of the outer-edge cover 22 formed by drawing can be changed appropriately depending on a thickness of the motor support sheet metal 2.

As described above, the outer-edge cover 22 is faced with an edge face of the printed circuit board 10b to guard against a fire spreading in a vertical direction relative to the edge face and a fire spreading toward the gears. However, instead of the outer-edge cover 22, a bent portion may be employed that is provided at least outside an edge portion of the printed circuit board 10b and bent to the side on which the drive motor 10 may be disposed. When the bent portion bent to the side on which the drive motor 10 is provided at least outside an edge portion of the printed circuit board 10b, a fire spreading from the edge portion of the printed circuit board 10b toward the gears can be shielded by the bent portion and fire spreading to the gears can be restrained. However, preferably, the height of the outer-edge cover 22 is extended to the same height as a surface of the printed circuit board 10b facing the rotor portion 10a and the outer-edge cover 22 is opposed to an edge face of the printed circuit board 10b completely. Such a configuration can fully guard against a fire spreading from an edge portion of the printed circuit board 10b toward the gears.

Figure 10:
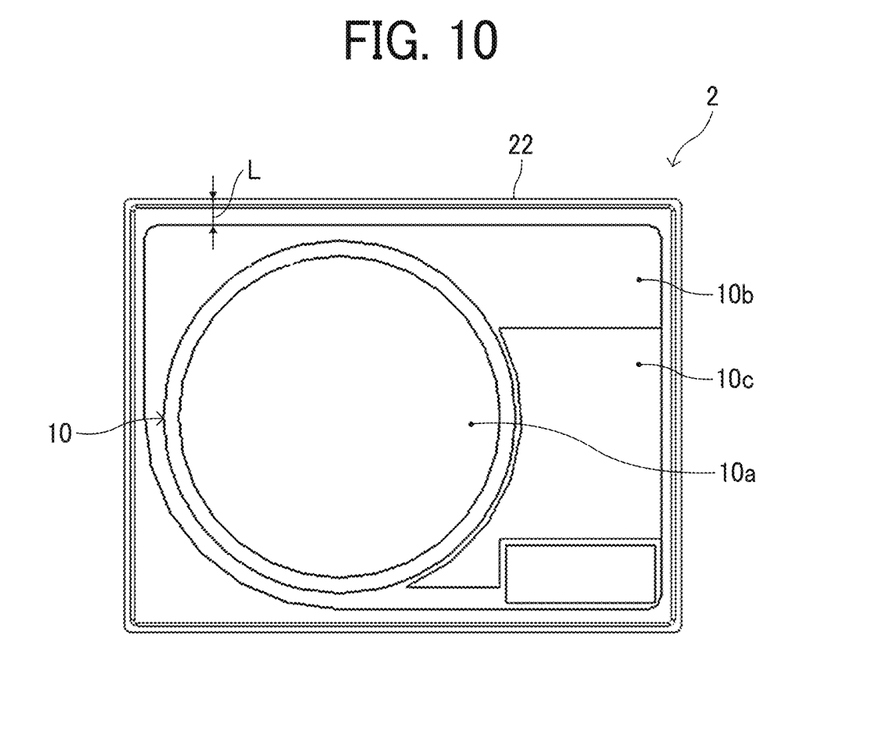
FIG. 10 is a front view of a drive motor and a motor support sheet metal.

FIG. 10 is a front view of the drive motor 10 and the motor support sheet metal 2.

As illustrated in FIG. 10, preferably, a clearance L between an outer edge of the printed circuit board 10b and the outer-edge cover 22 is set equal to or smaller than 3 mm and is set as narrow as possible.

Figure 11:
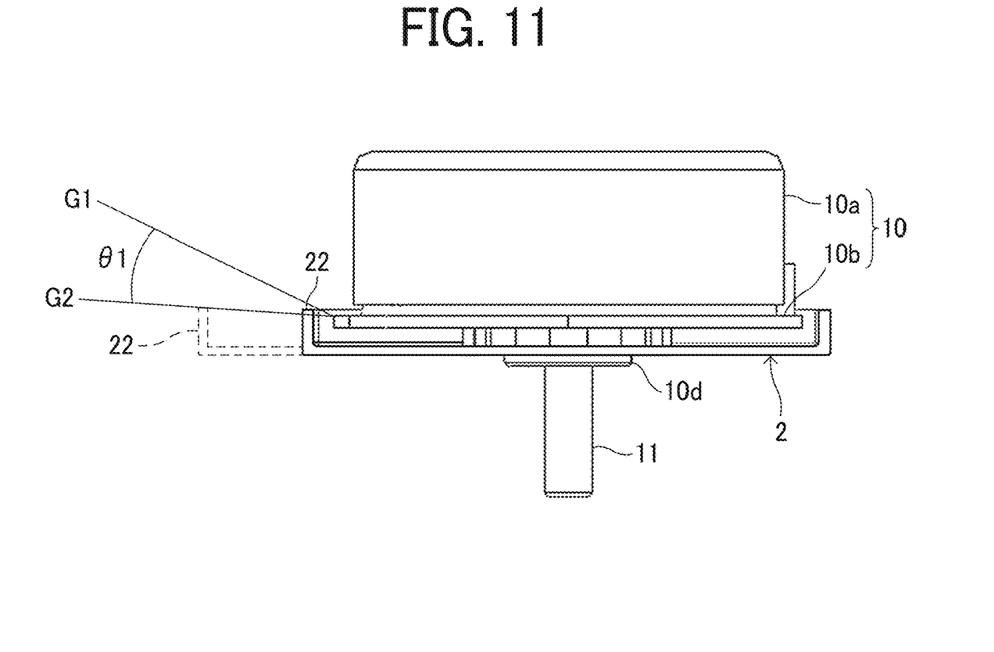
FIG. 11 is an illustration of how a flame develops differently when a clearance L between an outer edge of a printed circuit board, and an outer-edge cover is wide and when the clearance L is narrow.

FIG. 11 is a schematic view that illustrates a difference on how flames emerge from an edge portion of the printed circuit board 10b in a case in which the clearance L between the outer edge of the printed circuit board 10b and the outer-edge cover 22 is wide and in another case in which the clearance L is narrow.

As indicated with a dotted line in FIG. 11, when the clearance L between the outer edge of the printed circuit board 10b and the outer-edge cover 22 is wide, a line connecting the outer edge of the printed circuit board 10b and a top portion of the outer-edge cover 22 becomes a line G2. On the other hand, when the clearance L, indicated by a solid line in FIG. 11, between the outer edge of the printed circuit board 10b and the outer-edge cover 22 is narrow, a line connecting the outer edge of the printed circuit board 10b and a top portion of the outer-edge cover 22 becomes G1 and is positioned away from the gears and the line G2 by angle $\theta 1$.

A flame developing from an edge portion of the printed circuit board 10b is blocked by the outer-edge cover 22. When the clearance L between the outer edge of the printed circuit board 10b and the outer-edge cover 22 is wide, the flame develops on a side of the rotor portion 10a away from the line G2. On the other hand, when the clearance L between the outer edge of the printed circuit board 10b and the outer-edge cover 22 is narrow, a flame develops on a side of the rotor portion 10a than along the line G1. Therefore, the flame developing from an outer edge (edge portion) of the printed circuit board 10b can be kept away from the gears than a case in which the clearance L is wide. As a result, the narrower the clearance L between the outer edge of the printed circuit board 10b and the outer-edge cover 22 becomes, the farther away a flame developing from an edge portion of the printed circuit board 10b can be kept. Thus, it is possible to refrain the flame from spreading to the gears. If the clearance L between the outer edge of the printed circuit board 10b and the outer-edge cover 22 is at least equal to or smaller than 3 mm, the flame developing from an outer edge (edge portion) of the printed circuit board 10b can be kept farther away from the gears sufficiently.

Figure 12:
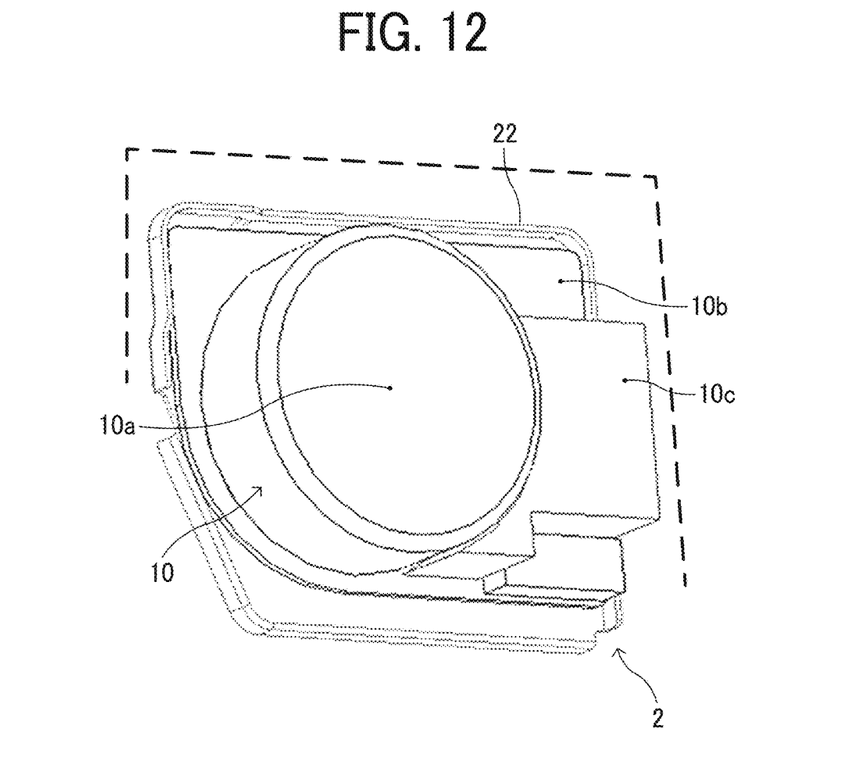
FIG. 12 is a perspective view of a part of the driving device according to an embodiment in which an outer-edge cover is provided for a portion of the driving device.

In the above description, the outer edge (end part) of the printed circuit board 10b is entirely covered with the outer-edge cover 22 (the outer-edge cover 22 is opposed to the end face of the printed circuit board 10b). However, as illustrated in FIG. 12, the outer-edge cover 22 may be provided only on a side where there is a combustible member such as a gear, and the outer-edge cover 22 may not be provided on a side where there is no combustible member such as a gear around. In the example of FIG. 12, combustible members are disposed outside a range indicated by a broken line in FIG. 12, and the outer-edge cover 22 is formed in the range.

Further, in a case in which a substrate is made of non-combustible material or flame-retardant material and the flame does not spread to the substrate and only elements mounted on the substrate may burn, an outer-edge cover may be provided in a position only where a flame may possibly develop from an outer edge of the substrate.

Thus, the outer-edge cover 22 may be provided to cover a portion of the printed circuit board 10b. Such an arrangement can reduce cost of material and the like compared to a case in which the outer edge of the printed circuit board 10b is entirely covered by the outer-edge cover 22, thus allowing the cost reduction of the apparatus.

In the present embodiment, the motor support sheet metal 2 is made of metal, but may be made of non-combustible material. Further, in the present embodiment, an example in which the present disclosure is applied to the driving device 1 as an electrical device has been described. However, the present disclosure can be applied to, for example, an electrical device such as a power supply device including a power supply board that supplies electricity to heating rollers of a fixing device or a controller as an electrical device including an engine board that controls an image forming unit of an image forming apparatus.

Aspect 1 The embodiments described above are examples and can provide, for example, the following effects, respectively.

A fire-spread prevention member, such as the motor support sheet metal 2, made of a non-combustible material is interposed between an electrical component such as the drive motor 10 and a combustible member such as a gear to prevent a fire from spreading to the combustible member. The fire-spread prevention member includes a bent portion such as the outer-edge cover 22 disposed outside an outer edge of an electrical component (for example, an edge portion of the printed circuit board 10b in the present embodiment) and bent to a side on which the electrical component is disposed.

With such a configuration, in an unlikely event that a flame develops from an outer edge of an electrical component (for example, an edge portion of the printed circuit board of the drive motor in the present embodiment), the bent portion such as the outer-edge cover 22 can prevent the flame from spreading toward the fire-spread prevention member. Owing to this arrangement, a flame developing from the outer edge of the electrical component can be prevented from spreading to a combustible member side from a fire-spread prevention member side. The flame can be prevented from spreading to the combustible member, such as the photoconductor gear 12 disposed on an opposite side of the electrical component across the fire-spread prevention member with the electrical component and outside the outer edge of the electrical component. As a result, the electrical component can increase safety of the apparatus in an unlikely event when fire ignites.

Aspect 2

In Aspect 1, the bent portion such as the outer-edge cover 22 covers an outer edge of an electronic board of the electrical component such as the printed circuit board 10b of the drive motor 10.

With this arrangement, as described in the above-described embodiments, the bent portion such as the outer-edge cover 22 can guard against a flame developing from the outer edge of the electronic board such as the printed circuit board 10b, thus preventing the fire from spreading to the combustible member.

Aspect 3

In Aspect 2, the bent portion such as the outer-edge cover 22 extends to a first side of the electronic board opposite to a second side of the electronic board such as the printed circuit board 10b facing the combustible member and the bent portion is configured to extend beyond a surface of the first side of the electronic board.

With this arrangement, as described in the above-described embodiments, a flame developing out from an outer edge of the electronic board such as the printed circuit board 10b can be kept away from the combustible member such as a gear and fire spreading to the combustible member.

Aspect 4

In any one of Aspects 1 to 3, a clearance between the outer edge of the electrical component and the bent portion such as the outer-edge cover 22 is equal to or smaller than 3 mm.

With this arrangement, as described in the above-described embodiments, a flame developing from an outer edge of an electronic board can be kept away from the combustible member, compared to an arrangement in which a clearance between the outer edge of the electrical component (for example, the edge portion of the printed circuit board 10b in the present embodiment) and the bent portion such as the outer-edge cover 22 is larger than 3 mm.

Aspect 5

In any one of Aspects 1 to 4, the bent portion such as the outer-edge cover 22 covers a portion of the outer edge of the electrical component.

Such an arrangement, as described in FIG. 12, can reduce the costs of material and the apparatus, compared to a case in which the entire outer edge of the electrical component is covered.

Aspect 6

In any one of Aspects 1 to 5, the fire-spread prevention member supports the electrical component such as the drive motor 10.

In such a configuration, the electrical component such as the drive motor 10 is supported on the fire-spread prevention member such as the motor support sheet metal 2. Thus, the number of parts and the cost of an apparatus can be reduced, compared with a configuration in which a fire-spread prevention member and a member supporting the electrical component are separately provided.

Aspect 7

An electronic device such as the driving device 1 includes an electrical component such as the drive motor 10 and the fire-spread prevention member according to any one of Aspects 1 to 6 disposed between the electrical component and a combustible member such as a gear to prevent a fire from spreading to the combustible member when fire ignites from the electrical component.

Such a configuration can prevent a fire from spreading to combustible members at low cost.

Aspect 8

In Aspect 7, the electrical component is a motor.

According to Aspect 8, even if a driving device IC or a capacitor mounted on a printed circuit board of a motor such as the drive motor 10 is ignited, a fire can be prevented from spreading to a combustible member such as a gear made of a combustible resin such as POM disposed in the vicinity of the motor and the like.

Aspect 9

An image forming apparatus includes the electrical component such as the driving device 1 according to Aspect 7 or 8.

Such a configuration can restrain fire from spreading to a combustible member mounted in the image forming apparatus at low cost.

In the above descriptions, the term "printing" in the present disclosure may be used synonymously with, e.g. the terms of "image formation", "recording", "printing", and "image printing". Further, the coater according to an embodiment of the present disclosure can also be applied to an apparatus that performs printing on an electrophotographic process on a sheet material coated with a coating liquid.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A fire-spread prevention member configured to be interposed between a motor and a combustible member, the fire-spread prevention member comprising:
   a flat portion configured to support the motor fixed thereto; and
   a bent portion extending from the flat portion and disposed outside an outer edge of the motor and bent to a side on which the motor is disposed, wherein
   the fire-spread prevention member is made of non-combustible material,
   the motor includes a shaft having a motor positioning portion attached thereto, and a motor mount attached to the motor positioning portion, and
   the flat portion of the fire-spread prevention member has a motor positioning hole therein configured to receive the shaft and a portion of the motor mount.

2. The fire-spread prevention member according to claim 1, wherein the bent portion is configured to cover an outer edge of an electronic board of the motor.

3. The fire-spread prevention member according to claim 2, wherein the bent portion is configured to extend to a first side of the electronic board opposite to a second side of the electronic board facing the combustible member.

4. The fire-spread prevention member according to claim 3, wherein the bent portion is configured to extend beyond a surface of the first side of the electronic board.

5. The fire-spread prevention member according to claim 1, wherein the bent portion is configured to cover a portion of the outer edge of the motor.

6. An electrical component unit comprising:
   the fire-spread prevention member according to claim 1; and
   the motor supported on the fire-spread prevention member.

7. An electrical device, comprising:
   the fire-spread prevention member according to claim 1; and
   the motor, wherein
   the fire-spread prevention member is interposed between the motor and the combustible member and made of non-combustible material.

8. An image forming apparatus, comprising:
   the electrical device according to claim 7.

9. The fire-spread prevention member according to claim 1, wherein the fire-spread prevention member is made of metal.

10. The fire-spread prevention member according to claim 1, wherein the motor mounting member has first holes therein and the fire-spread prevention member has second holes therein about the motor positioning hole such that the second holes are configured to correspond with the first holes when the motor is mounted to the fire-spread prevention member.

11. The fire-spread prevention member according to claim 10, wherein the fire-spread prevention member is made of a metal having a sufficient strength to support the motor when the motor is mounted to the fire-spread prevention member.

* * * * *